UNITED STATES PATENT OFFICE.

LORENZ HILTNER, OF MUNICH, GERMANY.

PROCESS FOR THE DESTRUCTION OF ANIMAL AND VEGETABLE PARASITES IN THE SOIL.

1,070,808.  Specification of Letters Patent.  Patented Aug. 19, 1913.

No Drawing. Application filed February 23, 1910. Serial No. 545,516.

*To all whom it may concern:*

Be it known that I, LORENZ HILTNER, professor, a subject of the German Emperor, residing at Munich, Bavaria, Germany, have invented a certain new and useful Process for the Destruction of Vegetable and Animal Parasites in the Soil, of which the following is a specification.

Anthracene oil, cresol, crude cresol and similar substances have proved to be valuable for the extermination of vegetable and animal parasites in the ground. When introduced into the ground these substances act similarly to bisulfid of carbon, that is to say, they first destroy by their poisonous action the animal and vegetable parasites in the ground, also the seeds of weeds, etc., after which they themselves are gradually decomposed, and the ground now appears more fruitful than before. The practical use of anthracene oil, cresol, crude cresol and similar substances for the destruction of ground parasites and seeds of weeds of all kinds, and for increasing the fertility of the earth is, however, impeded by the fact, that after these substances have been introduced into the ground a fairly long time elapses before their decomposition is completed and the ground can be sown with cultivated plants again. Now experiments have shown, that the decomposition of the aforesaid substances in the ground is very considerably accelerated, if they be mixed with humus or substances rich in humus, such as turf meal, bog earth, etc. Instead of the pure exterminating agents the preparations obtained by mixing them with humus, etc., according to the present invention are introduced into the ground. In addition to these substances others containing food stuffs for micro-organisms may also be mixed with the anthracene oil, etc.

In addition to being used for the treatment of the ground, preparations of the kind described may also be used with advantage in the preparation of composts and for the preservation of stable manure. When the stable manure so treated with anthracene oil, etc., is introduced into the ground, the above described reactions take place.

The time, within which the decomposition of anthracene oil, cresol, etc., mixed with humus or substances rich in humus, is completed, after they have been introduced into the ground, depends in the first place on the nature of the latter, the degree of moisture thereof and particularly upon the temperature. The process of decomposition goes on most quickly in the summer, provided that the necessary moisture is not lacking to too great an extent.

As an admixture to the aforesaid agents for the extermination of parasites in the ground, turf mixed with lime is particularly worthy of consideration. Mixtures of anthracene oil, cresol, etc., with carbonate of lime or quicklime or with manures rich in lime, such as Thomas-meal, raw phosphate, and above all with acid super-phosphate, may also be used, where a specially powerful action is not important.

What I claim is:—

1. The process for the destruction of vegetable and animal parasites in the ground by means of anthracene oil, which consists in introducing into the ground a mixture of anthracene oil with a material adapted to accelerate the decomposition of said anthracene oil, substantially as described.

2. The process for the destruction of vegetable and animal parasites in the ground by means of anthracene oil, which consists in introducing into the ground a mixture of anthracene oil with materials adapted to serve as food for micro-organisms, for the purpose of accelerating the decomposition of said anthracene oil, substantially as described.

3. The process for the destruction of vegetable and animal parasites in the ground by means of anthracene oil, which consists in introducing into the ground a mixture of anthracene oil with humus, in order to accelerate the decomposition of said anthracene oil, substantially as described.

4. The process for the destruction of vegetable and animal parasites in the ground by means of anthracene oil, which consists in introducing into the ground a mixture of anthracene oil with a material rich in humus, in order to accelerate the decomposition of said anthracene oil, substantially as described.

In testimony whereof I have hereunto set my hand in presence of two subscribing witnesses.

LORENZ HILTNER.

Witnesses:
   FRANZ RIEDL,
   ANTON HAUPDERHOFER.